United States Patent [19]

Tanaka et al.

[11] Patent Number: 5,044,222

[45] Date of Patent: Sep. 3, 1991

[54] DRIVE APPARATUS FOR OPENING/CLOSING AN OPERATION MEMBER

[75] Inventors: Motoyuki Tanaka, Tokyo; Fumikiyo Nakazawa, Hadano, both of Japan

[73] Assignee: Tokyo Electric Co., Ltd., Tokyo, Japan

[21] Appl. No.: 518,654

[22] Filed: May 3, 1990

[30] Foreign Application Priority Data

May 10, 1989 [JP] Japan .................................. 1-116990

[51] Int. Cl.[5] .......................... F16C 1/12; E05F 11/48
[52] U.S. Cl. ..................................... 74/500.5; 49/352; 74/89.15
[58] Field of Search ................. 49/352, 362; 74/89.15, 74/89.2, 89.21, 89.22, 500.5, 501.6, 502.2, 502.5

[56] References Cited

U.S. PATENT DOCUMENTS

| | | | |
|---|---|---|---|
| 2,762,606 | 9/1956 | Morse | 74/500.5 X |
| 2,919,911 | 1/1960 | Furtah | 74/89.15 |
| 4,074,463 | 2/1978 | Colanzi | 74/501.6 X |
| 4,402,160 | 9/1983 | Brusasco | 49/352 |
| 4,441,276 | 4/1984 | Chikaraishi | 49/352 |

FOREIGN PATENT DOCUMENTS 1077564  9/1960  Fed. Rep. of Germany .
118974   7/1959  Japan .

Primary Examiner—Allan D. Herrmann
Assistant Examiner—David W. Laub
Attorney, Agent, or Firm—Frishauf, Holtz, Goodman & Woodward

[57] ABSTRACT

A drive apparatus includes a commutator motor having a hollow rotation shaft with an internally threaded section provided therein and a flexible power transmission cable inserted through the hollow rotation shaft such that a spiral thread-like rib of the cable engages with the internally threaded section of the hollow rotation shaft, whereby a propulsive force is transmitted to the cable to allow a window glass to be moved in a reciprocating motion. A guide roller with an intermediate section of the cable wrapped therearound is rotatably supported on a guide base to allow the passage of the cable. A curved guide section is provided relative to the guide roller to define a curved cable passage channel in a manner to cover a wrapped cable portion. The guide roller is rotated by the commutator motor through the cable, while the intermediate portion of the cable is pressed onto the guide roller.

34 Claims, 11 Drawing Sheets

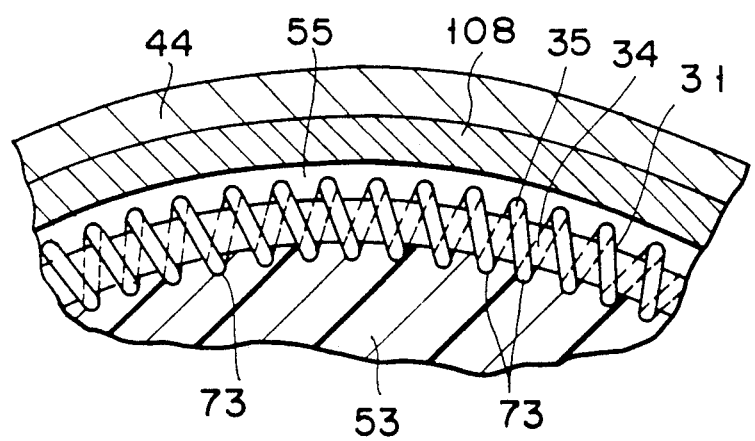
FIG. 9
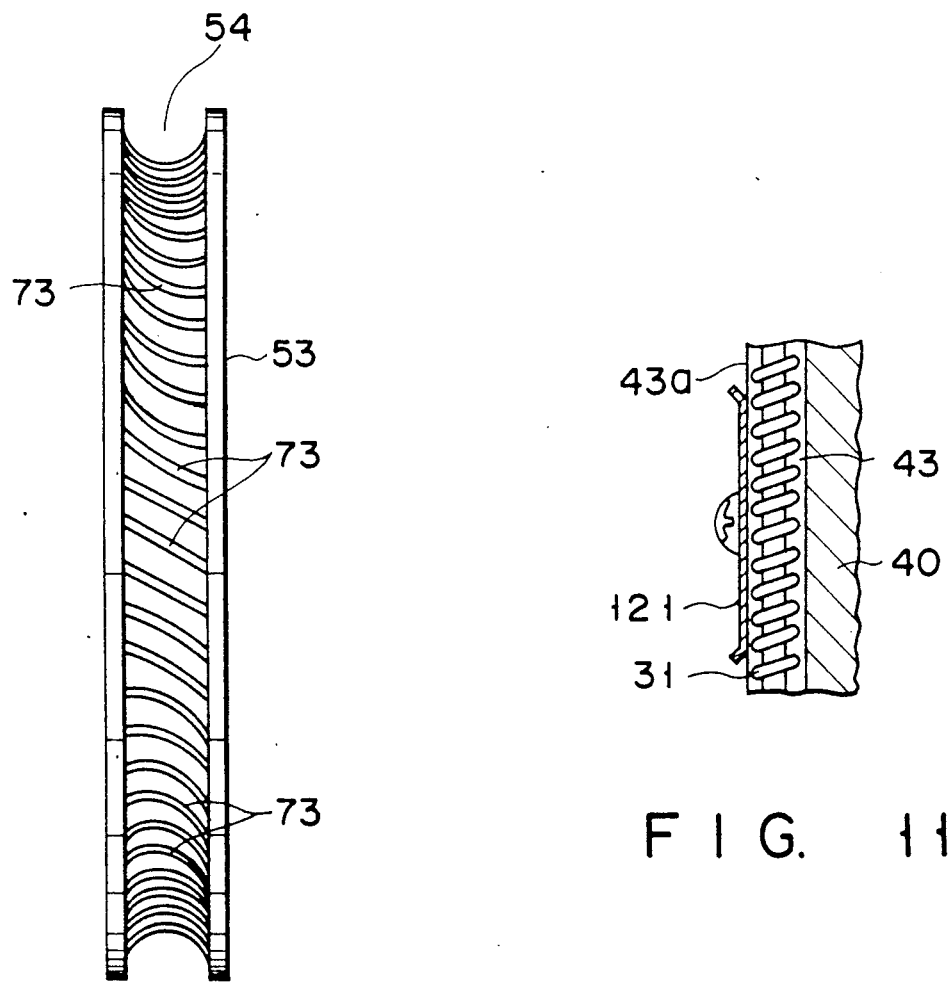
FIG. 10
FIG. 11

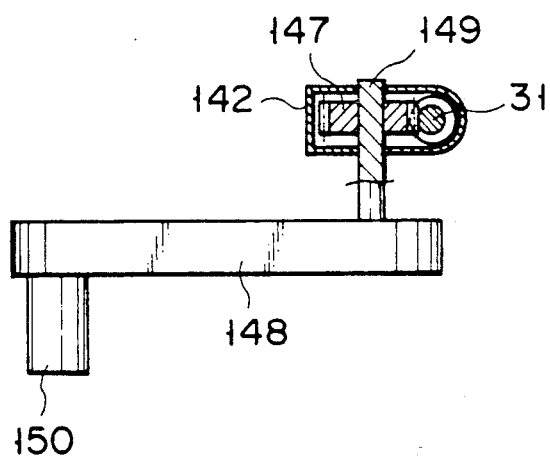
F I G. 21
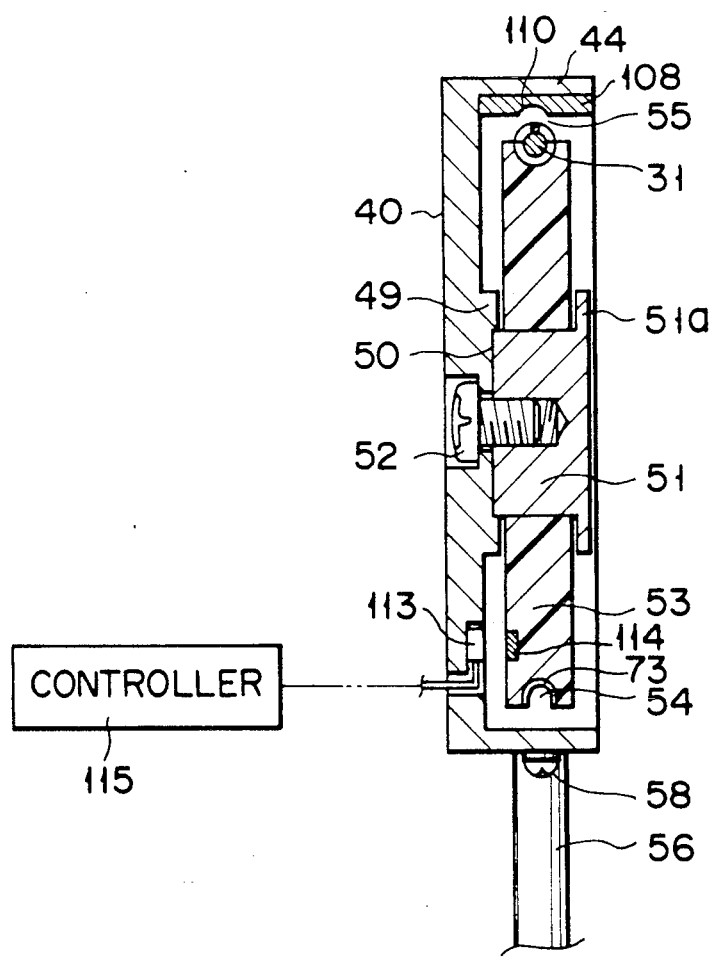
F I G. 22

DRIVE APPARATUS FOR OPENING/CLOSING AN OPERATION MEMBER

BACKGROUND OF THE INVENTION

1. Field of the Invention

The present invention relates to a drive apparatus which is used as a drive source for opening/closing a window mounted on the roof and door of an automobile, as a drive source for opening/closing the door of the automobile and as a drive source required to open/close an operation member mounted in and on the house, building, machine equipment or the like.

2. Description of the Related Art

A drive apparatus for opening/closing a glass window connected to a power transmission cable by moving that cable in an axial direction is known in the art. This type of cable is obtained by spirally winding a wire on the outer periphery of a wire rope (core wire) so that the spiral wire provides a spiral rib as a spiral tooth-like projection. The cable is inserted through a metal guide pipe and moved in that state. The cable is moved in an axial direction by a motor or by manually rotating a handle.

The cable is flexible in nature and is freely handled, thus offering the advantage of arranging an associated motor and handle with a proper latitude. For this reason, the guide pipe may have a curved portion.

In the conventional guide pipe having such a curved portion, however, when the glass window as a load is to be moved, a portion of the cable is slidably moved, while being tightly engaged with the inner surface of the curved portion of the pipe. A larger frictional resistance occurs at the curved portion of the cable, failing to effectively transmit a propulsive force from the motor or handle to the load.

With the curvature radius of the curved portion of the cable set to be small, than a greater frictional resistance is unfavorably increased at the curved portion of the cable. For this reason, it is difficult to make the drive apparatus compact.

Further, since the guide pipe is made of a metal as set out above, a noise is liable to be produced at the curved portion of the cable during the slide movement of the cable.

Suppose that the conventional drive apparatus is used to open/close the glass window in a down/up motion. In this case, the weight of the window glass affects the speed with which the glass window is moved. That is, the different speed is involved between moving the window in the upward direction and moving the window in the downward direction.

SUMMARY OF THE INVENTION

It is accordingly an object of the present invention to provide a drive apparatus which can improve the efficiency with which a force is transmitted from a cable drive means to an associated operation member and can achieve a compact unit of low noise.

Another object of the present invention is to provide a drive apparatus which can balance the speed with which an operation member is moved in an up and a down motion.

The drive apparatus of the present invention comprises:

a power transmission cable comprising of a wire rope and a spiral tooth-like rib formed on an outer periphery of the rope, the cable including one end and another end and a flexible intermediate portion between both ends, the one end connected to the operation member;

a guide roller around which the intermediate portion of the Cable is wrapped in a curved fashion;

a guide base having a roller support shaft for rotatably supporting the guide roller and a curved guide section provided relative to the guide roller to define a curved cable passage channel in a manner to cover a cable wrapping portion of the guide roller; and a cable drive means having an engaging member for engaging with the spiral tooth-like rib and a rotation member for rotating the engaging member, to move the cable in its axial direction to allow the operation member to be moved in a reciprocating motion to open and close the latter member.

According to the present invention, the intermediate flexible portion of the power transmission cable is curved around the curved channel defined between the guide roller and the curved guide section of the guide base. The operation of the cable drive means causes the cable to be moved in its axial direction due to a variation in an engagement of the spiral tooth-like rib of the cable with the corresponding engaging member. By so doing, the operation member is moved in a reciprocating motion so that it is opened and closed. When the operation member is moved in one direction, the intermediate portion of the cable is moved along the aforementioned curved channel while being pressed onto the outer periphery of the guide roller. At this time, the guide roller is rotated as the cable is moved in its axial direction.

Therefore, less friction resistance is produced at a location between the cable and the guide roller, thus improving the efficiency with which a propulsive force is transmitted from the cable drive means to the operation member. As already set forth above, the cable can be moved without a slide motion along the guide roller. This feature ensures less noise at the location of the aforementioned curved channel and is achieved even if the guide roller is made smaller in diameter. It is possible to obtain a compact drive apparatus having a curved channel of a smaller diameter.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 9 is a partial, cross-sectional view showing an engagement of a spiral-toothed rib-equipped cable with a guide roller;

FIG. 10 is a side view showing the guide roller;

FIG. 11 is a cross-sectional view, as taken along line 11—11 in FIG. 2;

FIG. 21 is a plan view, partly in section, showing a drive apparatus according to the fourth embodiment of the present invention; and FIG. 22 is a side view, taken along line 22—22 in FIG. 20.

DETAILED DESCRIPTION OF THE PREFERRED EMBODIMENTS

A first embodiment of the present invention will be explained below with reference to the accompanying drawings.

Figure 1:
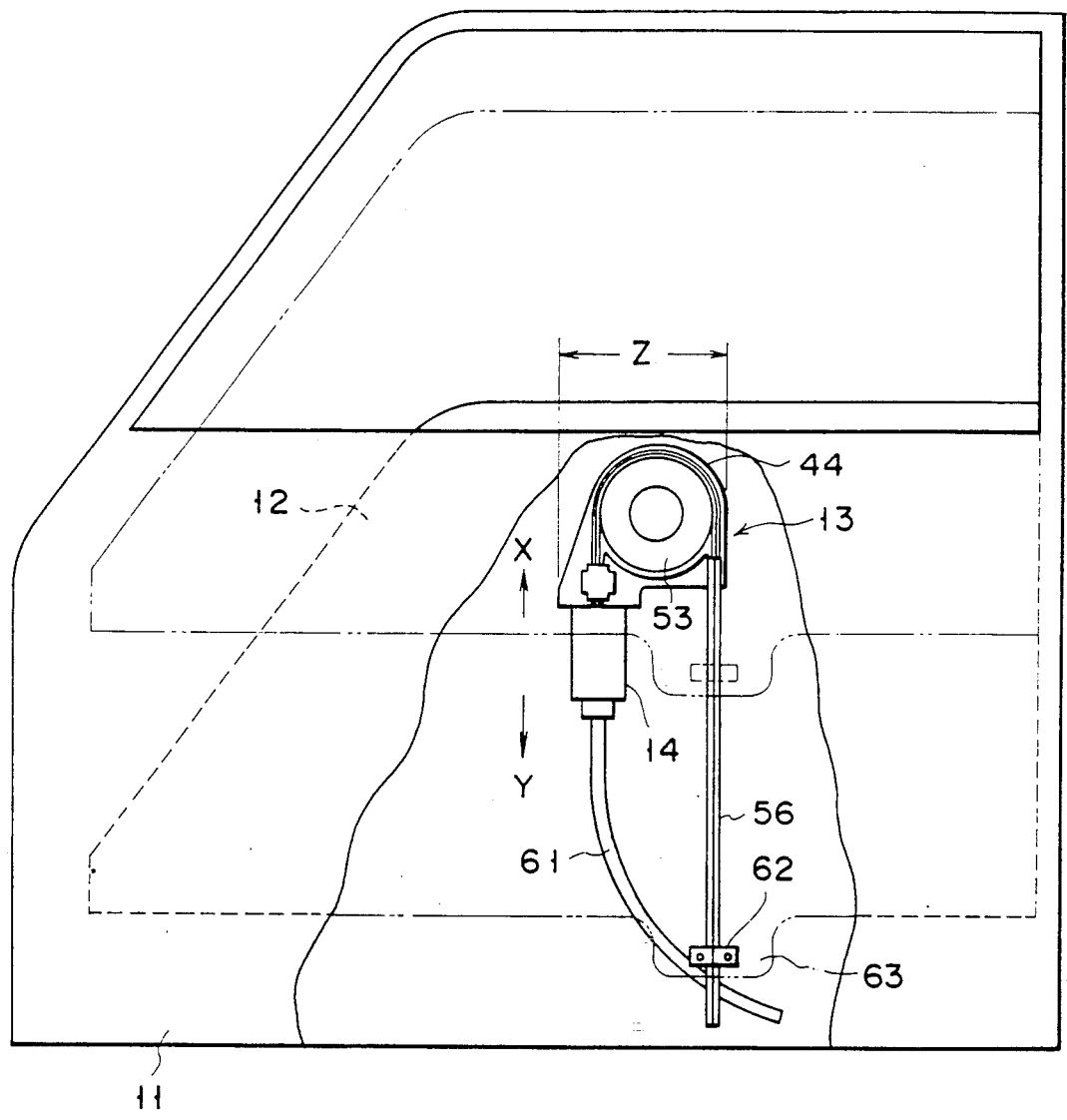
FIG. 1 is a front view, partly broken away, showing the door of an automobile which incorporates a drive apparatus according to a first embodiment of the present invention.
Figure 2:
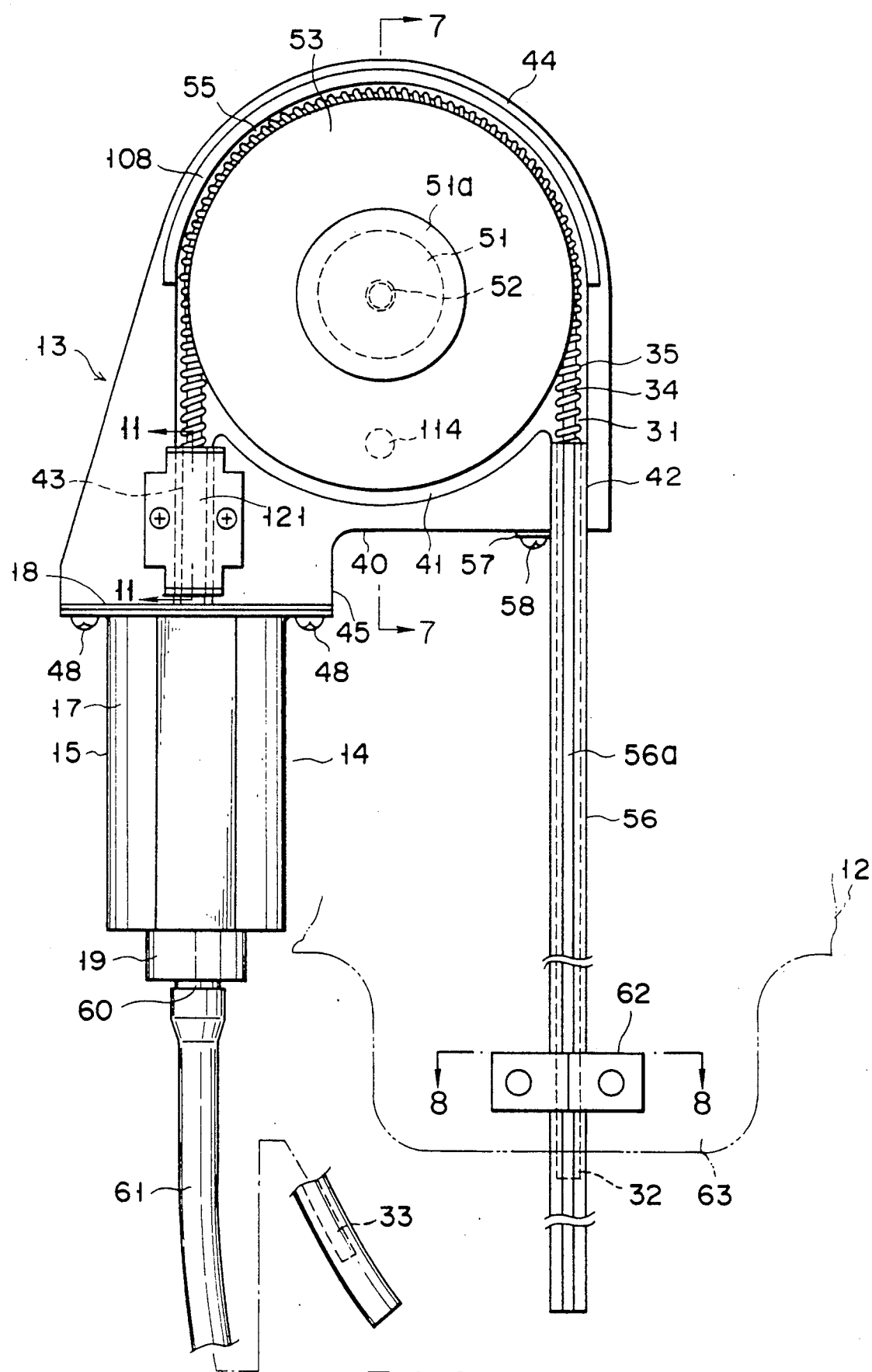
FIG. 2 is a front view showing the drive apparatus with the portion of a guide pipe omitted.

In FIG. 1, a glass window 12 is shown which is mounted on a door 11 of an automobile and adapted to be reciprocably opened and closed in a down/up direction by a drive apparatus 13. The drive apparatus 13 includes a cable drive means which can be rotated in a normal or a reverse direction by switching a current direction. The cable drive means comprises a commutator motor 14.

Figure 3:
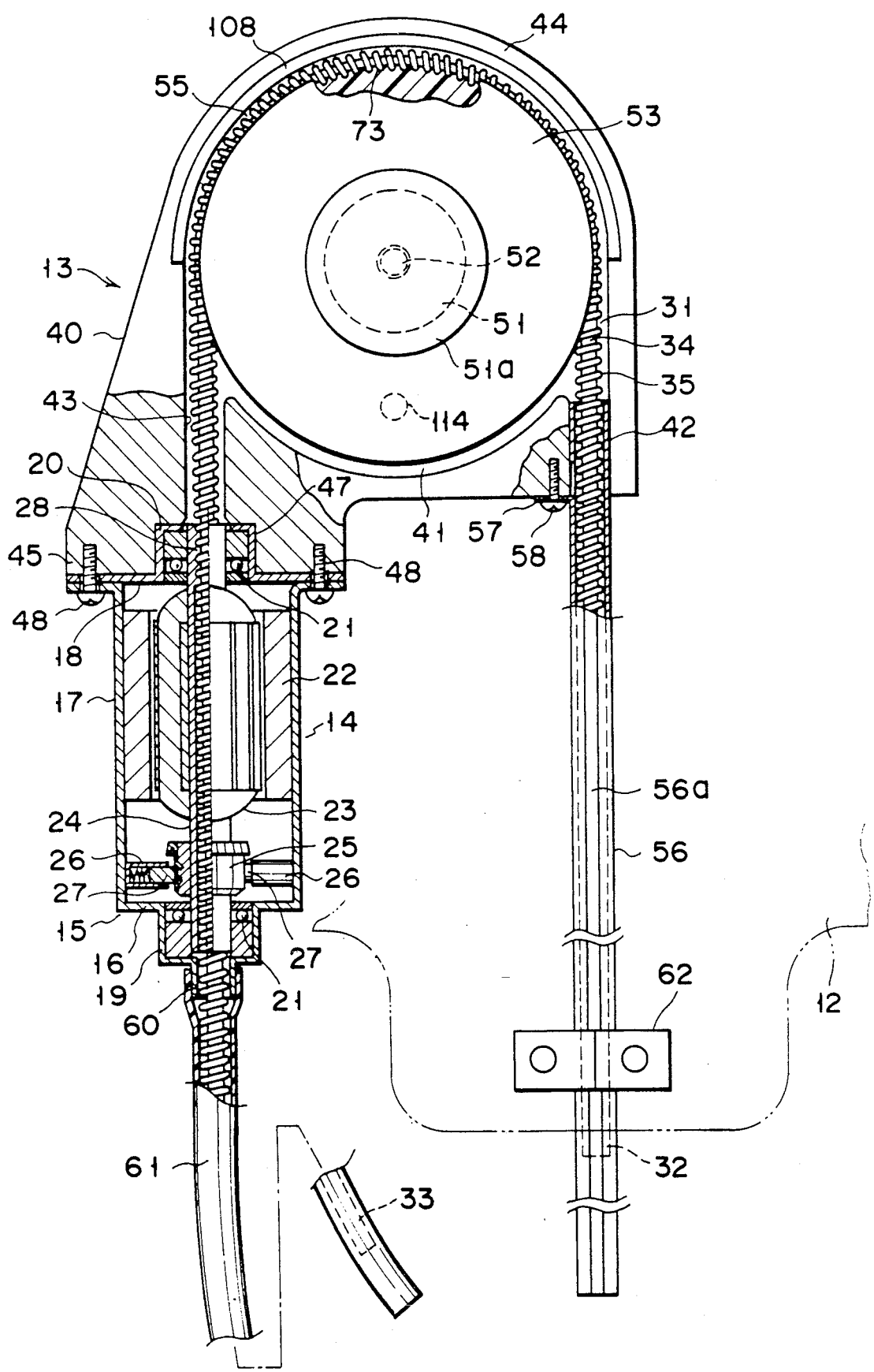
FIG. 3 is a front view, partly in section, showing the drive apparatus with the portion of the guide pipe omitted.
Figure 4:
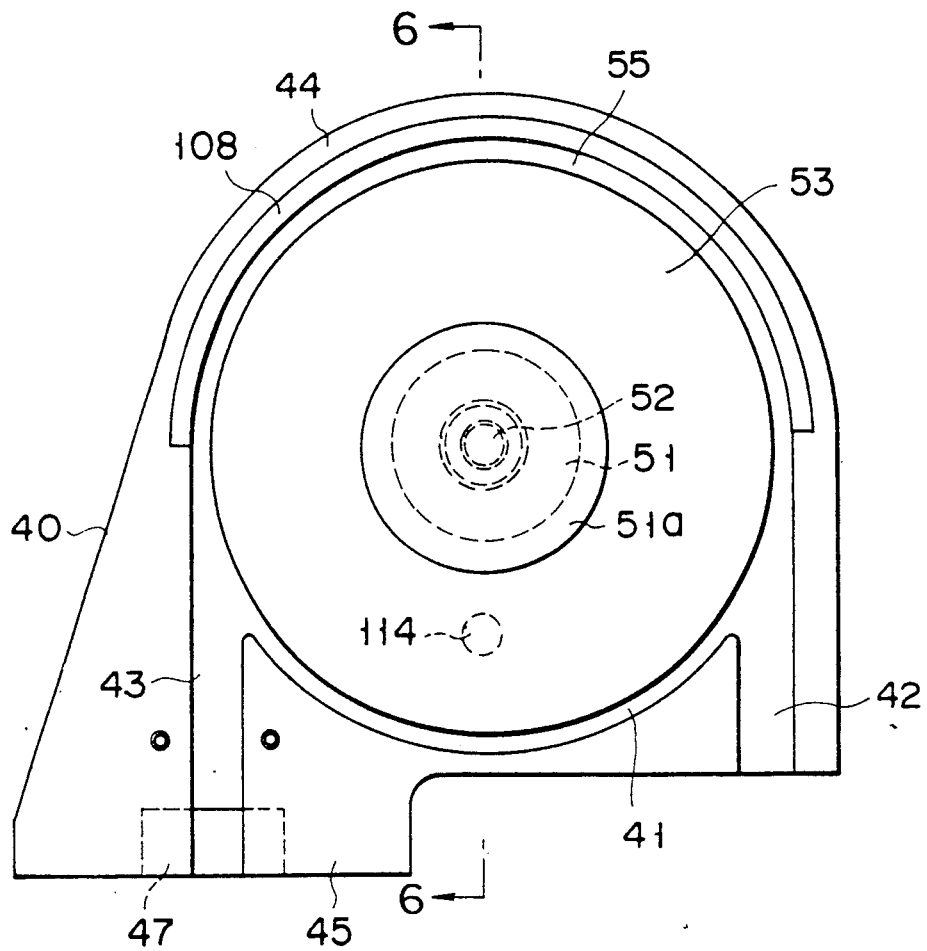
FIG. 4 is a front view showing a guide base with a guide roller mounted thereon.

The commutator motor 14 has a housing 15 as shown in FIG. 3 in more detail. The housing 15 has a housing body 17 for use as a yoke and an end plate 18. The housing body 17 is cylindrical in configuration and has a bottom wall 16 at one end and is opened at the other end. The end plate 18 of the housing is connected to the open end of the housing body 17 to close the open end of the housing. A pair of bearing holding sections 19 and 20 are provided one on the bottom (16) side and one on the end plate (18) side and extend outwardly along the axial direction of the housing 15. The bearings 21, 21 are held one in the bearing holding section 19 and one in the bearing holding section 20.

A pair of stators 22 made of a permanent magnet are attached to the inner surface of the housing body 17 such that they are situated within the housing 15 at a location between the bearings 21 and 21. An armature 23 is provided within the housing at a location between the paired stators 22 and 22.

Armature 23 is comprised of a rotation shaft 24 as a rotation member and a commutator 25 mounted on the rotation shaft 24. The rotation shaft 24 is rotatably supported by the pair of bearings 21, 21. A pair of brush units 26, 26 are mounted on the housing body 17 such that their brushes 27, 27 are pushed against the commutator 25 in the housing.

The rotation shaft 24 is comprised of a cylindrical pipe with its inner diameter on the end plate 18 side formed as a narrow section relative to the rest of the cylindrical pipe. An internally threaded section 28 is provided as an engaging member on the inner surface of the end portion of the rotation shaft 24 on the end plate 18 side of the housing.

A commutator motor 14 is employed to apply a propulsive force to the power transmission cable 31. A cable 31 of flexible nature is obtained by spirally forming a tooth-like rib 35 on the outer periphery of a wire rope 34 having one end 32 and another end 33. The spiral tooth-like rib 35 is formed at a predetermined pitch on the outer periphery of the wire rope 34 and is fixed there. The cable 31 is inserted through the rotation shaft 24 with its spiral tooth-like rib 35 engaged with the internally threaded section 28 of the rotation shaft 24.

The aforementioned drive apparatus 13 includes a guide base 40 made of a light metal, such as a die cast product made of an aluminum alloy. As shown in FIGS. 2 to 7 in more detail, the guide base 40 comprises a recess 41, first and second cable guide grooves or channels 42 and 43, a curved guide section 44 and a guide mount section 45.

Figure 5:
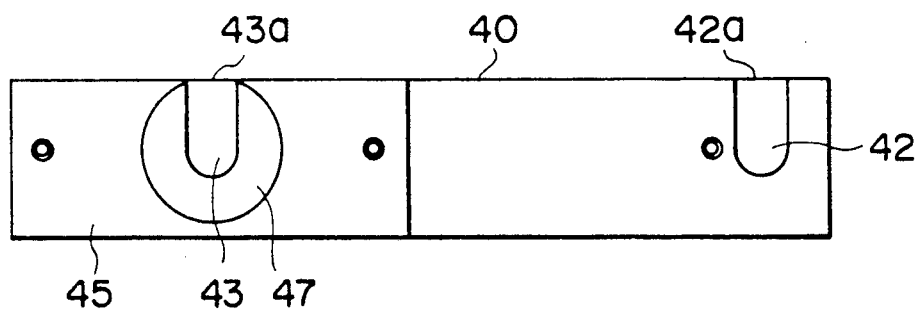
FIG. 5 is a bottom view showing the guide base of FIG. 4.

The recess 41 is circular in configuration with the upper section defined by a circular wall to provide the aforementioned curved guide section 44. The first and second cable guide grooves 42 and 43 are situated in a spaced-apart relation and the upper ends of the cable guide grooves 42 and 43 are opened into the recess 41. The motor mount section 45 is downwardly projected below the guide base 40 and the lower portion of the second cable guide groove 43 is situated relative to the motor mount section 45. The motor mount section 45 has a hole 47 leading to the second cable guide groove 43, noting that the hole is formed on the lower surface side of the motor mount section 45. In FIG. 5, reference numerals 42a and 43a represent the openings of the first and second cable guide grooves 42 and 43, respectively.

As shown in FIG. 3, the aforementioned commutator motor 14 is mounted on the guide base 40 by fitting the bearing holding section 20 into the hole 47 of the guide base 40 and attaching the housing end plate 18 to the lower surface of the motor mount section 45 by screws 48.

Figure 6:
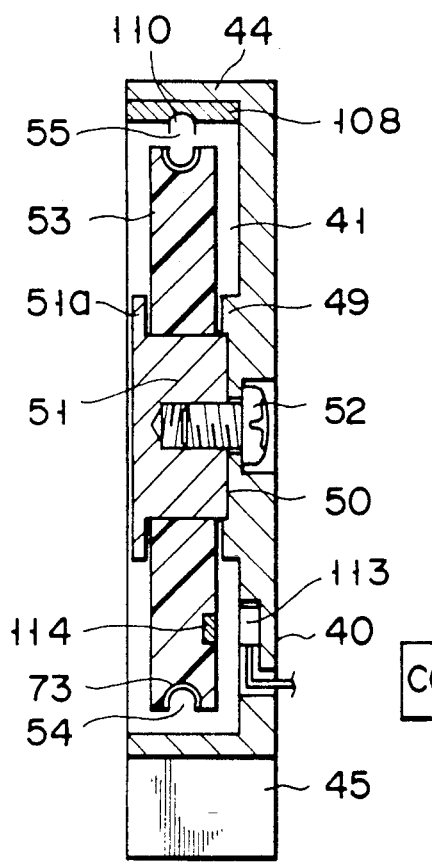
FIG. 6 is a cross-sectional view, taken along line 6—6 in FIG. 4, showing the guide base.
Figure 7:
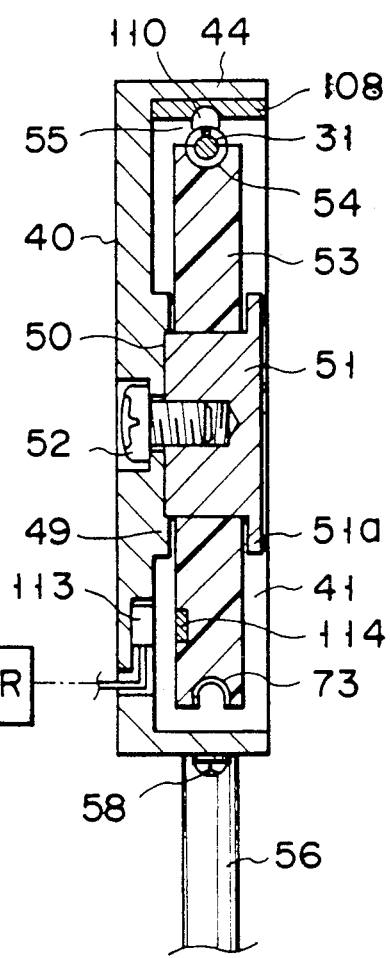
FIG. 7 is a cross-sectional view, taken along line 7—7 in FIG. 2, showing the guide base.

A projection 49 is provided on the central portion of the bottom surface of the aforementioned recess 41 as shown in FIGS. 6 and 7. A support recess 50 is formed at the central portion of the projection 49 and a roller support shaft 51 is fitted into the support recess 50 and fixed by a corresponding screw 52 to the guide base 40. The roller support shaft 51 is made of iron and has a flange 51a at its forward end.

A guide roller 53 is rotatably supported on the roller support shaft 51 and made of synthetic resin such as polyacetal. The guide roller 53 is prevented by the projection 49 and flange 51 from being moved in the axial direction. An annular groove 54 is formed on the whole outer periphery of the guide roller 53 so that the cable 31 as set out above is moved along the annular groove 54. A large number of mating grooves 73 are formed on the outer periphery of the guide roller 53 as shown in FIGS. 6, 7, 9 and 10. The tooth-like rib 35 of the cable 31 engages with the groove 73 of the guide roller 53.

The upper portion of the outer periphery of the guide roller 53 held within the recess 41 is covered with the curved guide section 44. The inner surface of the curved guide section 44 is lined with a braking member 108. A curved passage 55 for allowing the passage of the cable 31 is defined between the braking member 108 and hence the curved guide section 44 on one hand and the upper portion of the outer periphery of the guide roller 53 on the other hand. The braking member 108 is made of a material, such as a wear-resistant asbestos and synthetic rubber, which has a greater friction coefficient than that of a material of which the guide base 40 is made. A groove 110 is provided in the inner surface of the braking member 108 in a manner to face the cable 31 which is wrapped on the outer periphery of the guide roller 53. The groove 110 is extended in the longitudinal direction of the braking member 108.

A position detection sensor 113 is mounted on the bottom wall of the recess 41 of the guide base 40 as shown in FIGS. 6 and 7 and faces are side surface of the guide roller 53. As the sensor 113, use is made of a magnetism-sensitive type semiconductor element, such as a Hall element and Hall IC. A magnet 114 is mounted on the guide roller 53 and, upon the rotation of the guide roller 53, can be brought into proximity to the sensor 113. At least one magnet 114 is provided as the magnets. When a plurality of magnets 114 are used in the embodiment of the present invention, they are located on the guide roller 53 on an imaginary circle drawn with the same radius. The output terminal of the position detection sensor 113 is connected to a controller 115 to control the operation of the commutator motor 14.

A cover 121 (see FIGS. 2 and 11) made of a sheet metal is fixed by screws to the guide base 40 to block the opening 43a of the second cable guide channel 43.

An upper end of a first guide pipe 56 is connected to the first cable guide groove 42 to allow a communication with the groove 42. A struck-out portion of the upper end portion of the pipe 56 is secured by a screw means 58 to the undersurface of the guide base 40. By so doing, the first guide pipe 56 extends in a straight line in a direction in which the glass window is moved. The first guide pipe 56 is made of a metal and has a slit 56a in the axial direction as shown in FIG. 8.

A downwardly directed cylinder 60 is provided integral with the bearing holding section 19 which is located under the commutator motor 14. The upper end portion of a second guide pipe 61 is connected to the cylinder 60. The pipe 61 is comprised of a vinyl tube.

The cable 31 is connected at one end 32 to a first guide pipe 56 and first cable guide groove 42 and at the other end 33 to the second cable guide groove 43, rotation shaft 24 of the commutator motor 14 and second guide pipe 61. The intermediate portion of the cable 31 is wrapped on the upper, outer periphery of the guide roller 53 and curved along a curved channel 55.

Figure 8:
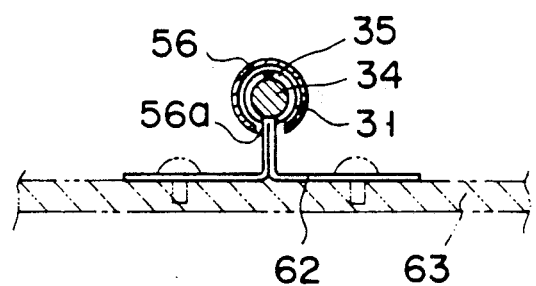
FIG. 8 is a cross-sectional view as taken along line 8—8 in FIG. 2.
Figure 12:
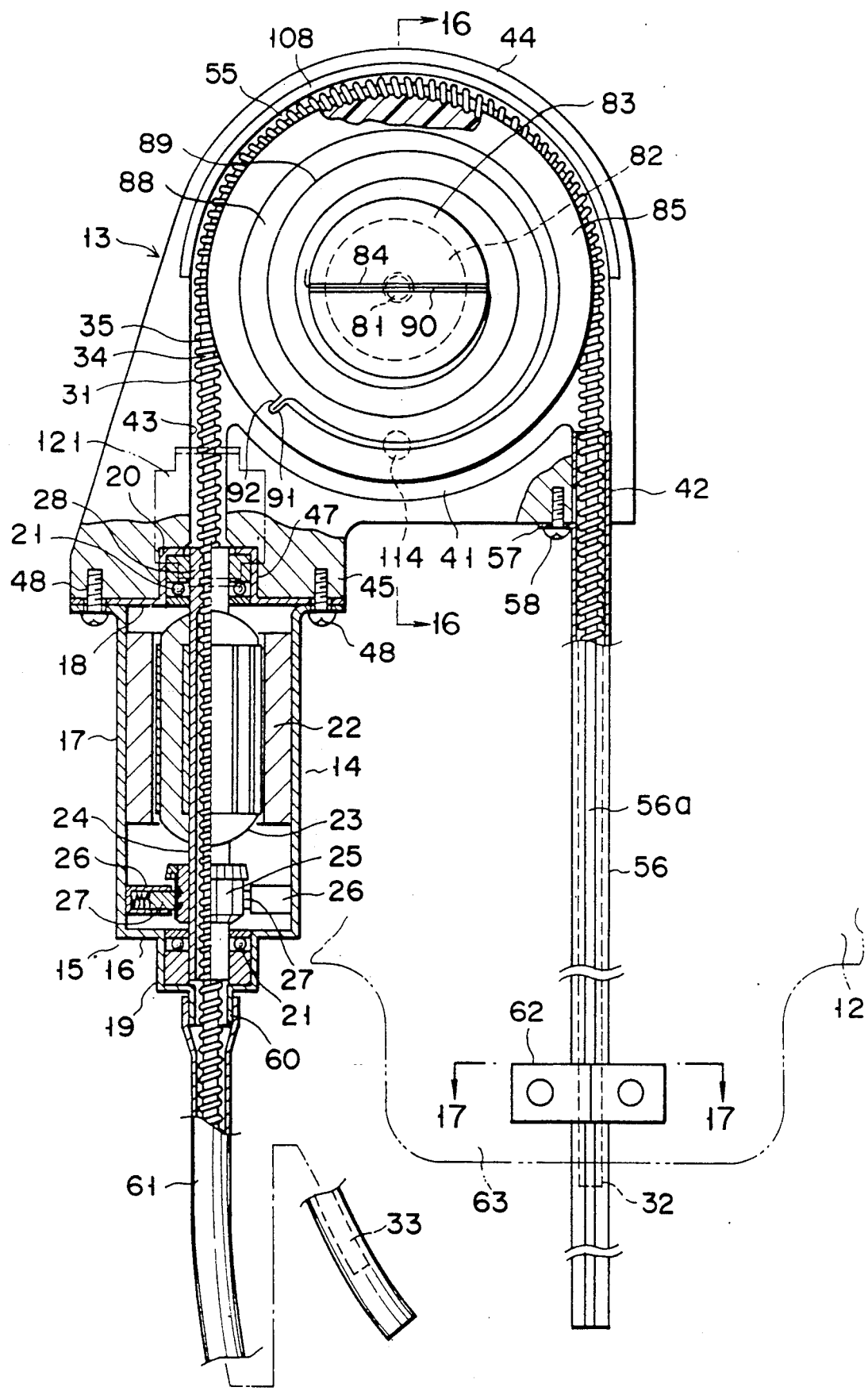
FIG. 12 is a front view, partly in section, showing a drive apparatus according to a second embodiment of the present invention with the portion of a guide pipe omitted.
Figure 13:
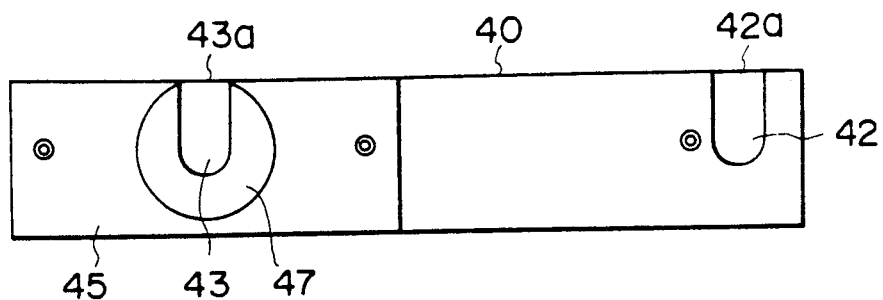
FIG. 13 is a bottom view showing a guide base of drive apparatus of the second embodiment.
Figure 14:
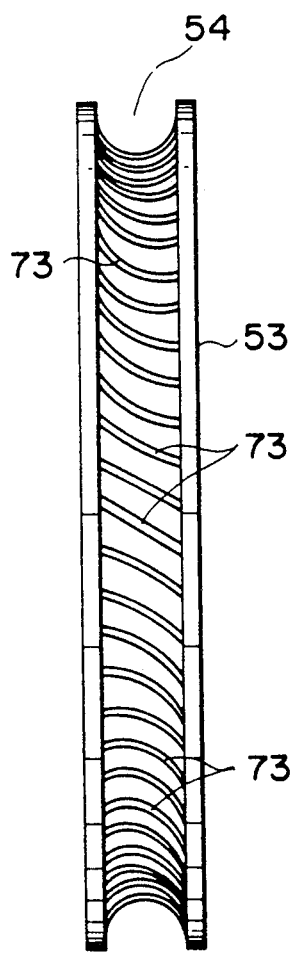
FIG. 14 is a side view showing a guide roller of the second embodiment.
Figure 15:
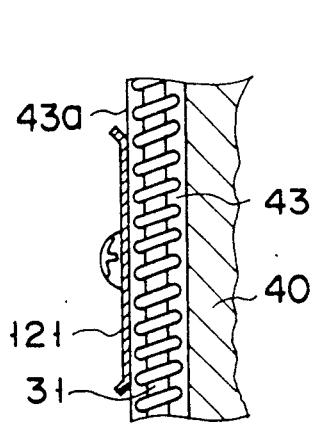
FIG. 15 is a cross-sectional view showing a second cable guide channel of the second embodiment.
Figure 16:
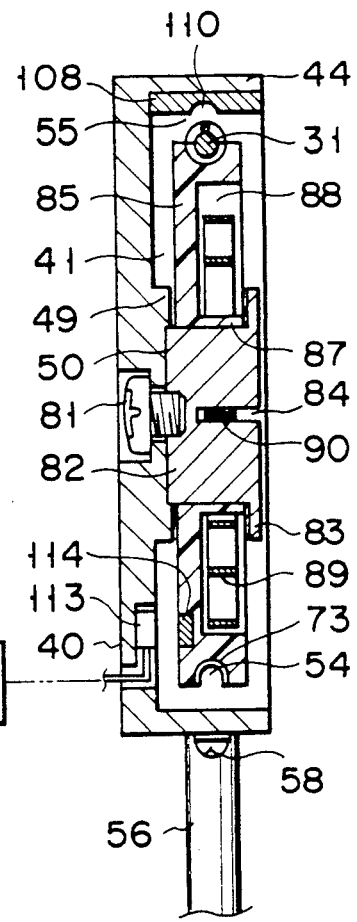
FIG. 16 is a cross-sectional view as taken along line 16—16 in FIG. 12.
Figure 17:
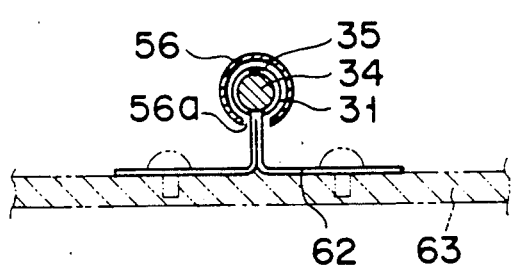
FIG. 17 is a cross-sectional view, taken along line 17—17 in FIG. 12.

A connector 62 is welded to one end 32 of the cable 31 and extends through the slit 56a in a manner shown in FIG. 8. A downward projection 63 possessed by the glass window 12 is connected to the connector 62 as shown in FIG. 8.

When the commutator motor 14 is operated in the drive apparatus to cause a normal rotation of the armature 23, the cable 31 is given a propulsive force, in a direction indicated by an X direction in FIG. 1, due to a variation in the engagement of the spiral tooth-like rib 35 of the cable 31 with the internally threaded section 28 of the rotation shaft 24, allowing the cable 31 to be run upwardly from the commutator motor 14 in the axial direction.

Then the intermediate portion of the cable 31 is moved past the cable guide groove 43 and then along the curved passage 55 while being curved. The cable 31 is moved down toward the guide pipe 56. As a result, the glass window 12 is lowered through the connector 62 which is moved down together with the cable 31. In this way, the window is opened.

When, on the other hand, the armature 23 of the commutator motor 14 is reverse-rotated from the open-state position of the glass window, the cable 31 is given a propulsive force, in a direction indicated by an arrow Y in FIG. 1, due to a change in the engagement of the spiral tooth-like rib 35 of the cable 31 with the internally threaded section 28 of the rotation shaft 24. For this reason, the cable 31 is moved down toward the side on which the commutator motor 14 is located.

By so doing, the intermediate portion of the cable 31 is moved along the curved passage 55 at which time the one end 32 of the cable 31 is moved up the guide pipe 56. As a result, the window glass is moved up, from a position indicated by solid line in FIG. 1, through the connector 62, and the glass window is closed. The dot-dash lines in FIG. 1 show a state in which the window glass is moved up.

Upon the opening and closing of the glass window, the cable 31 is moved against the weight per se of the window glass 12. For this reason, the intermediate portion of the cable 31 is moved, while being firmly wrapped around the outer periphery of the guide roller 53. The guide roller 53 is rotated, with the movement of the cable 31, with the roller support shaft 51 as a center.

Since the intermediate portion of the cable 31 is moved with the rotation of the guide roller 53, there occurs a less friction force between the two. It is thus possible to, upon the closing of the window, improve the efficiency with which a propulsive force can be transmitted from the commutator motor 14 to the window glass 12.

Upon the opening of the window, the weight per se of the window glass can be utilized and, therefore, the efficiency with which a force is transmitted is not decreased to too low an extent in spite of the fact that the intermediate portion of the cable 31 is slidably moved around the curved guide section 44.

Further, since it is possible to prevent the sliding movement of the cable 31 around the curved guide section 44 upon the pushing up of the window glass, a noise generation at that time can be reduced.

This advantage can also be obtained even if the guide roller 53 is made to have a smaller diameter. This feature can reduce the curvatures of the guide roller 53 and curved guide section 44. Thus the width Z (see FIG. 1) of the guide base 40 and hence the drive apparatus as a whole can be made smaller than otherwise.

Further, upon the upward movement of the window glass toward the "closed" direction, the spiral tooth-like rib 35 of the cable 31 which is wrapped around the curved surface of the guide roller 53 engages with the corresponding engaging groove 73 of the guide roller.

For this reason, the cable 31 can prevent a sliding movement around the curved surface of the guide roller 53. It is thus possible to prevent wear on the guide roller 53 and cable 31. It is also possible to positively transmit a force to the window glass 12 and hence to push up the window glass.

In the window-open operation mode, the intermediate portion of the cable 31 which is wrapped around the curved passage 55 of the guide roller is moved toward the "window open" side while being pushed onto the braking member 108 lined on the curved guide section 44. For this reason, the unwanted movement of the cable 31 is suppressed by the friction resistance of the spiral tooth-like rib to the braking member 108. Thus the downward movement of the window glass can be slowed down. The window glass 12 can be moved up and down at a balanced speed in spite of the weight per se of the window glass 12. The groove 110 of the braking member 108 provides a greater contact surface to the cable 31, thus increasing a braking power.

Although the aforementioned explanation has been made in connection with using the commutator motor 14 as the cable drive means, the window glass can be moved up and down by a balanced operation even in manual mode.

The aforementioned drive apparatus 13 includes the position detection sensor 113, magnet 114 and controller 115, enabling the user to tell the position of the window glass and to control the speed of movement of the window glass.

That is, the guide roller 53 is rotated as the cable 31 is moved therearound. The magnet 114 is brought into proximity to the position detection sensor 113 each time the guide roller is rotated through weight given angle. At each time, the position detection sensor 113 delivers a detection signal. The detection signal is processed by a proper circuit including the controller 115. The processing includes, for example, a step for counting the number of detection signals and finding the distance of movement of the window glass and a step for measuring the interval of the detection signal and performing the speed control of the commutator motor 14 on the result of measurement. It is thus possible to determine the step time of the commutator motor 14 on the basis of the calculation of the distance covered and to achieve a balanced speed, by the speed control, in the reciprocating movement of the window glass.

The drive apparatus 13 has a cover 121 so as to block the opening 43a of the cable guide groove 43. This can prevent the cable 31 from being displaced from the opening 43a. This apparatus proves useful in the case where the window is locked in the "closed" state due to, for example, the freezing of the window glass.

Upon being given a downward propulsive force in spite of the state in which the window lass is not moved, the cable 31 tries to be displaced out of the guide base 40 through the opening 43a of the cable guide groove or channel 43, but such a displacement is prevented by the cover 121. It is thus possible to prevent a failure of the drive apparatus 13.

FIGS. 12 to 17 show a second embodiment of the present invention.

FIGS. 12, 13, 14, 15, 16 and 17 correspond to FIGS. 3, 5, 10, 11, 7 and 8, respectively, in the first embodiment. The second embodiment is different from the first embodiment in that a means is provided for equalizing the speed with which the window lass is moved in the up and down directions.

That is, a roller support shaft 82 is fixed by a corresponding screw 81 to a guide base 40 and has a flange 83 at its forward end. Further, the shaft 82 has a groove 84 which is cut from the roller support shaft side. A guide roller 85 which is rotatably supported on the roller support shaft 82 is made of synthetic resin, such as polyacetal.

A cylindrical section 87 is provided at the central area of the guide roller 85 such that it is rotatably fitted over the roller support shaft 82. A circular, spring holding recess 88 is formed in the guide roller 85 such that it is situated along the cylindrical section 87. A spiral spring 89 is held, as a winding spring, in the spring holding recess 88, noting that the winding spring 89 represents a spring of a given cross-section wound in a plane with a central axis as a center.

An inner end 90 of the spiral spring 90 is anchored to the aforementioned engaging groove 84. An outer end 91 of the spiral spring 89 is anchored to an engaging groove 92 formed in the inner surface of the spring holding recess 88. The spiral spring 89 is of such a type that, upon the movement of the cable 31 in a direction in which the window lass is lowered, it is elastically deformed into a compact, that is a small-diameter, unit with the spring firmly wrapped on the cylindrical section 87 in an energy-stored state. When the cable 31 is moved in a direction in which the window lass is pushed up, the spiral spring 89 is loosened into a large-diameter one, releasing its stored energy.

In place of the spiral spring, use may be made of a coil spring serving as a torsion spring, a volute spring, etc.

Except for the above features, the second embodiment is similar to the first embodiment and any further explanation is omitted.

According to the second embodiment, upon the lowering of the window glass in the "window open" mode, the guide roller 85 around which the intermediate portion of the cable 31 is wound is rotated in a clockwise direction. When this is done, the spiral spring 89 in the spring holding recess 88 is firmly wrapped around the roller support shaft B2 and elastically deformed into a compact, that is a small-diameter, unit of stored energy.

When, therefore, the window glass is pushed up against its own weight to cause the cable 31 to be moved toward the side on which the window is closed, the spiral spring 89 is restored into the original large-diameter one, releasing its stored energy. As a result, an added rotation force is imparted to the guide roller 85 in a counter-clockwise direction, thus increasing the speed with which the guide roller 85 and window glass 12 are moved.

In the second embodiment, the speed with which the window glass is moved in the up and down directions can be equally balanced in spite of the weight per se of the window glass 12.

The other operations of the second embodiment will be readily understood by referring to the operation of the first embodiment and any further explanation is therefore omitted.

Figures 18, 19:
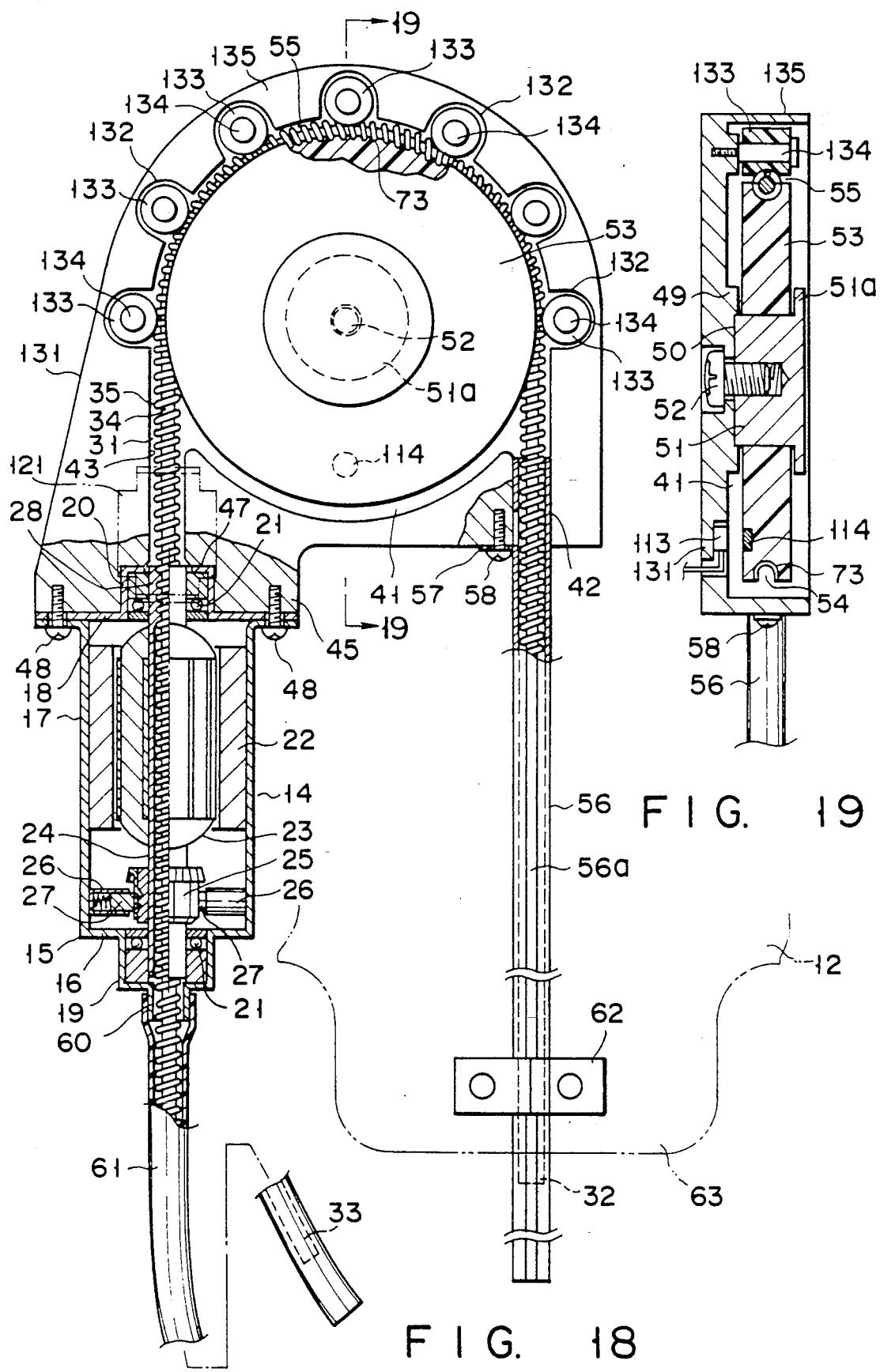
FIG. 18 is a front view, partly in section, showing a drive apparatus according to a third embodiment of the present invention with the portion of a guide pipe omitted.
FIG. 19 is a cross-section, as taken along line 19—19 in FIG. 18.

FIGS. 18 and 19 show a third embodiment of the present invention.

FIGS. 18 and 19 substantially correspond to FIGS. 3 and 7, respectively, of the first embodiment of the present invention. The third embodiment is similar to the first embodiment in that a means is provided for smoothly moving the cable upon the lowering of the window glass.

Seven holding sections 132 are provided at a predetermined interval on the curved guide section 135 formed at the upper portion of the guide base 131. The holding sections 132 lead to the recess 41. Auxiliary rollers 133 are each held in the corresponding holding section 132 in a manner to face the recess 41. Reference numeral 134 shows a support shaft for rotatably supporting the corresponding auxiliary roller 133.

The third embodiment is similar to the first embodiment except for the arrangement as set forth above and any further explanation is omitted with identical reference employed to designate parts or elements corresponding to those shown in the first embodiment.

According to the third embodiment, the intermediate portion of the cable 31 is guided on the guide roller 53 or on the many auxiliary rollers 133 upon the reciprocating movement of the cable 31 in the forward and backward directions. The cable 31 can e moved under less friction without a sliding action along the curved guide section 44. This assures a smooth movement of the cable 31 and improves the efficiency with which power is transmitted from the commutator motor 14 to the window glass.

Any other operations of the third embodiment will readily be understood from the explanation of the first embodiment and any further explanation is, therefore, omitted.

Figure 20:
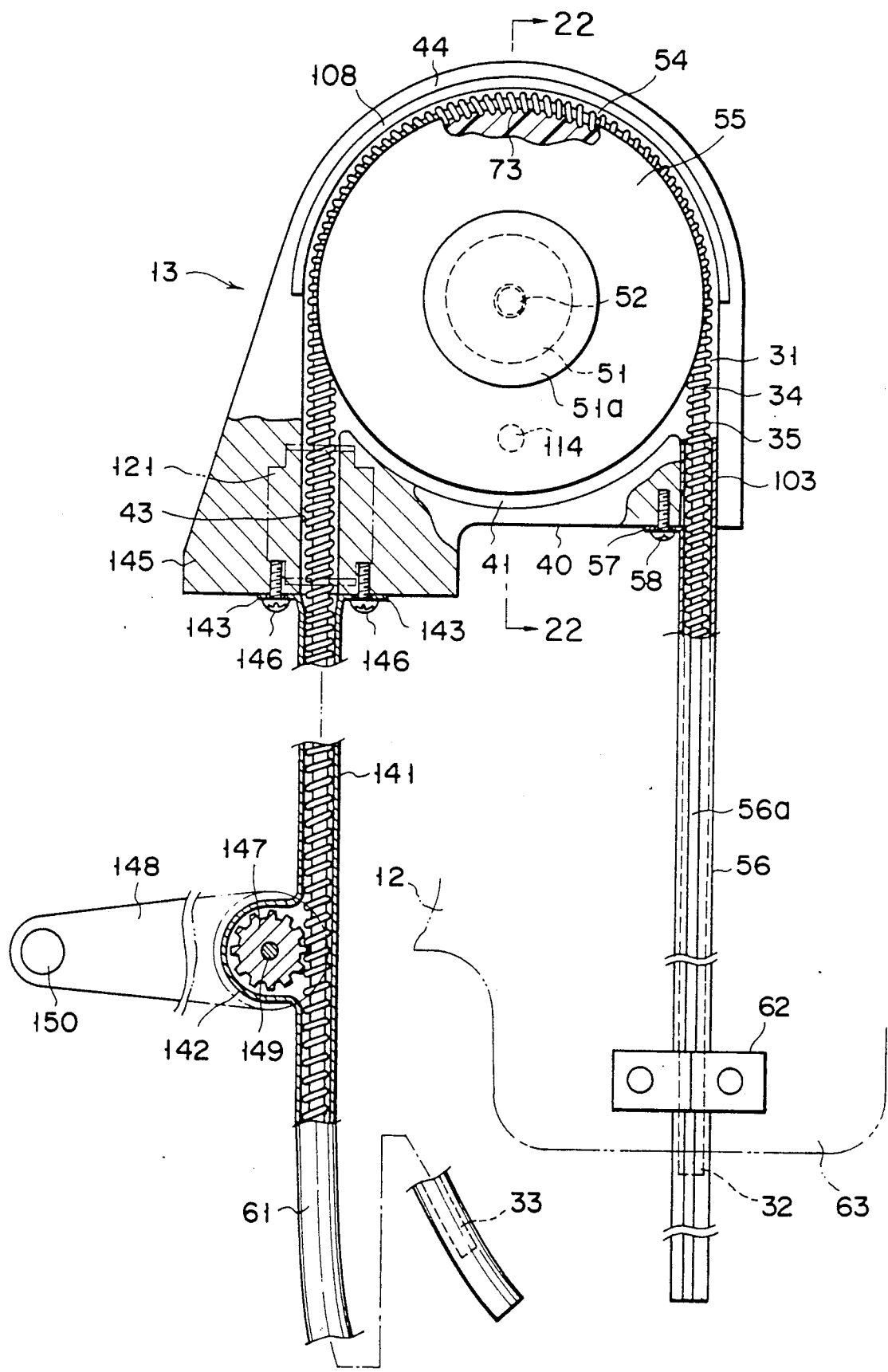
FIG. 20 is a front view, partly broken away, showing a drive apparatus according to a fourth embodiment of the present invention with the portion of a guide pipe omitted.

FIGS. 20 to 22 show a fourth embodiment of the present invention.

FIGS. 20 and 22 substantially correspond to FIGS. 3 and 7, respectively. The fourth embodiment is different from the first embodiment in that the drive means is of a manual type.

A guide pipe 141 made of a metal is bulged partway to provide a ear holding section 142. A pair of bent mount pieces 143, 143 are provided on the upper end of the guide pipe 141. The mount pieces 143, 143 are secured by screws 146 to the lower surface of a pipe mount section 145 provided at the lower section of a guide base 144. The upper open end of the guide pipe 141 is connected to the lower end of a cable guide groove or channel 43 to permit a communication between the two.

A gear 147 holds a ear 147, as an engaging member, in the gear holding section 142 and engages with a spiral tooth-like rib 35 of a cable 31 which is inserted through the guide pipe 141. A shaft 149 is rotatably supported within the ear holding section 142 and provided, as a rotation member, on one end portion of a handle 148 with the ear 147 supported thereon. A shaft-like rip 150 is projected on the other end of the handle 148 which is rotated with the shaft 149 as a center. The handle 148 is rotated by the operation of the rip 150.

By manually rotating the handle 148, the ear 147 is rotated, transmitting a propulsive force to the cable 31 to allow the cable 31 to be moved in its axial direction.

The other operations of the fourth embodiment will readily be understood from the explanation of the first embodiment and any further explanation is, therefore, omitted.

The present invention is not restricted to the aforementioned respective embodiments. The guide base may be made of synthetic resin, such as polyacetal. Needless to say, the aforementioned operation member is not restricted to the glass window. The operation member may be opened and closed in a horizontal direction by the drive apparatus of the present invention in which case the braking member and winding spring may be omitted. In the case where the commutator member is used as the drive means, the motor may be provided in a spaced-apart relation to the guide base and, in this case, a guide pipe made of a metal may be passed between the motor nd the guide base with the cable inserted through the guide pipe.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A drive apparatus for opening and closing an operation member in a reciprocable motion, comprising:
   a power transmission cable comprised of a wire rope and a spiral tooth-like rib formed on an outer periphery of the rope, the cable including one end and another end being and a flexible intermediate portion between both ends, the one end connected to the operation member;
   a guide roller around which the intermediate portion of the cable is wrapped in a curved fashion;
   a guide base having a roller support shaft to rotatably support the guide roller and a curved guide section covering the intermediate portion of the cable to provide a curved channel relative to the guide roller to allow the cable to pass through the curved channel; and
   a cable drive means having an engaging member engaging with the spiral tooth-like rib and a rotation member rotating the engaging member, to move the cable in an axial direction to move the operation member in a reciprocating motion so that the operation member is opened and closed.

2. The drive apparatus according to claim 1, wherein the guide roller includes an outer periphery with an engaging groove for engaging with the spiral tooth-like rib of the cable.

3. The drive apparatus according to claim 1, wherein the guide roller includes an outer circular periphery with an annular groove with which said cable is engaged.

4. The drive apparatus according to claim 1, wherein said guide base is mounted around said roller support shaft and has a recess partly defined by said curved guide section and holding said guide roller, a first cable guide channel leading to the recess, and a second cable guide channel communicating with the recess at a location spaced apart from the first cable guide channel.

5. The drive apparatus according to claim 1, wherein said cable drive means includes a commutator motor which is rotatable in a normal and reverse direction, said commutator motor including a housing having a pair of bearings, a pair of stators mounted on the housing, an armature located between the pair of stators and having a hollow rotation shaft rotatably supported on the pair of bearings with said cable inserted therethrough and a commutator mounted on the hollow rotation shaft, and a pair of brush units mounted in the housing to be pushed against the commutator, said rotation shaft having an internally threaded section for engaging with said spiral tooth-like rib of said cable.

6. The drive apparatus according to claim 1, wherein said cable drive means has a handle having a shaft mounted on one end portion, a grip mounted on the other end portion and a gear supported on the shaft of the handle and meshing with said spiral tooth-like rib of said cable.

7. The drive apparatus according to claim 4, wherein said cable drive means includes a commutator motor which is rotatable in a normal and reverse direction, said commutator motor including a housing having a pair of bearings, a pair of stators mounted on the housing, an armature located between the pair of stators and having a hollow rotation shaft rotatable supported on the pair of bearings with said cable inserted therethrough and a commutator mounted on the hollow rotation shaft, and a pair of brush units mounted in the housing to be pushed against the commutator, said rotation shaft having an internally threaded section for engaging with said spiral tooth-like rib of said cable, and said commutator motor being mounted on the guide base to allow one end of the rotation shaft of the commutator motor to communicate with the second cable guide channel; and which includes a straight guide pipe through which one end of the cable is inserted, the guide pipe being connected at one end to said first cable guide channel to permit a communication there.

8. The drive apparatus according to claim 7, which includes a cover mounted on said guide base to block said second cable guide channel.

9. The drive apparatus according to claim 1, wherein the guide roller includes an object to be detected and which includes a position detection sensor mounted on the guide base to detect said object.

10. The drive apparatus according to claim 9, wherein said object includes a magnet.

11. The drive apparatus according to claim 9, wherein said position detection sensor includes a magnetism-sensitive semiconductor element.

12. The drive apparatus according to claim 1, wherein said guide roller is made of synthetic resin.

13. The drive apparatus according to claim 1, wherein said guide base is made of a metal.

14. The drive apparatus according to claim 1, wherein said guide base is made of synthetic resin.

15. The drive apparatus according to claim 1, which moves said operation member in an up/down reciprocating motion, and which includes a braking member arranged on an inner surface of said curved guide section of that said cable slides thereon when said cable is moved in a direction in which the operation member is lowered.

16. The drive apparatus according to claim 15, wherein said braking member extends in a longitudinal direction thereof, and has a groove facing the portion of said cable wrapped around said guide roller.

17. The drive apparatus according to claim 1, wherein a number of auxiliary rollers are located at a given interval to face said curved guide section.

18. The drive apparatus according to claim 1, wherein said reciprocable motion is an up/down reciprocable motion, and further comprising:
a winding spring having one end connected to the guide roller and another end connected to the roller support shaft and adapted to store a spring energy when the cable is moved in a direction in which the operation member is lowered and to release the stored spring energy when the cable is moved in a direction in which the operation member is pushed up.

19. The drive apparatus according to claim 18, wherein the guide roller includes an outer periphery with an engaging groove for engaging with the spiral tooth-like rib of the cable.

20. The drive apparatus according to claim 18, wherein the guide roller includes an outer circular periphery with an annular groove with which said cable is engaged.

21. The drive apparatus according to claim 18, wherein said guide base has a recess provided around said roller support shaft, partly defined by said curved guide section and holding said guide roller, a first cable guide channel leading to the recess and a second cable guide channel connected to the recess at a location spaced-apart from the first cable guide channel.

22. The drive apparatus according to claim 18, wherein said cable drive means includes a reversible commutator motor, the motor including a housing having a pair of bearings, a pair of stators mounted on the housing, an armature located between the stators, and rotatably supported relative to the pair of bearings, and having a hollow rotation shaft in which the cable is moved and a commutator mounted on the hollow rotation shaft, and a pair of brush units mounted on the housing to be pushed against the commutator, the hollow rotation shaft having an internally threaded section which engages with a spiral tooth-like rib of the cable.

23. The drive apparatus according to claim 18, wherein said cable drive means has a handle a shaft on one end portion, and a grip on the other end portion and a gear supported on said shaft to engage with the spiral tooth-like rib of the cable.

24. The drive apparatus according to claim 21, wherein said cable drive means includes a reversible commutator motor, the motor including a housing having a pair of bearings, a pair of stators mounted on the housing, an armature located between the stators, and rotatably supported relative to the pair of bearings, and having a hollow rotation shaft in which the cable is moved and a commutator mounted on the hollow rotation shaft, and a pair of brush units mounted on the housing to be pushed against the commutator, the hollow rotation shaft having an internally threaded section which engages with a spiral tooth-like rib of the cable, and said commutator motor being mounted on the guide base such that one end of its rotation shaft is Connected to said second cable guide channel to communicate with each other, and a straight guide pipe, through which one end of the cable is inserted, is connected at one end to said first cable guide channel of the guide base to allow a communication there.

25. The drive apparatus according to claim 24, which includes a cover mounted on said guide base to block said second cable guide channel.

26. The drive apparatus according to claim 18, wherein the guide roller includes an object to be detected and which includes a position detection sensor mounted on said guide base to detect the object.

27. The drive apparatus according to claim 18, wherein said object to be detected includes a magnet.

28. The drive apparatus according to claim 18, wherein said position detection sensor includes a magnetism-sensitive type semiconductor element.

29. The drive apparatus according to claim 18, wherein said guide roller is made of synthetic resin.

30. The drive apparatus according to claim 18, wherein said guide base is made of a metal.

31. The drive apparatus according to claim 18, wherein said guide base is made of synthetic resin.

32. The drive apparatus according to claim 18, wherein a braking member is arranged on an inner surface of said curved guide section so as to allow the cable to be moved in a slide motion when the cable is moved in a direction in which said operation member is lowered.

33. The drive apparatus according to claim 32, wherein said braking member extends in a longitudinal direction and has a groove facing the portion of said cable wrapped around the guide roller.

34. The drive apparatus according to claim 18, wherein said winding spring comprises of a spiral spring.

* * * * *